United States Patent [19]

Scott

[11] Patent Number: 4,700,331

[45] Date of Patent: Oct. 13, 1987

[54] APPARATUS FOR SEISMIC SURVEYING

[76] Inventor: Peter J. Scott, 59 The Avenue, West Wickham, Kent. BR4 0EE, England

[21] Appl. No.: 835,003

[22] Filed: Feb. 28, 1986

[30] Foreign Application Priority Data

Mar. 4, 1985 [GB] United Kingdom ................ 8505496

[51] Int. Cl.[4] .......................... G01V 1/00; G08G 1/12
[52] U.S. Cl. ...................................... 367/68; 181/114; 340/995
[58] Field of Search ............................ 367/68, 19, 77; 340/995, 988; 181/114, 139, 140; 342/176, 184, 454, 455, 457; 364/424, 449, 444, 448, 460; 33/264, 141 E, 141.5

[56] References Cited

U.S. PATENT DOCUMENTS

| | | | |
|---|---|---|---|
| 2,548,226 | 4/1951 | Maier | 33/264 |
| 2,681,633 | 6/1954 | Basso | 33/264 X |
| 3,859,732 | 1/1975 | Davin | 33/264 |
| 3,929,206 | 12/1975 | Bendenbender et al. | 181/114 |
| 4,176,458 | 12/1979 | Dunn | 33/141 E |
| 4,201,972 | 5/1980 | Edwards et al. | 367/60 X |
| 4,312,557 | 1/1982 | Fitzgerald | 364/424 X |
| 4,323,990 | 4/1982 | Goode et al. | 367/21 |
| 4,470,119 | 9/1984 | Hasebe et al. | 364/424 X |
| 4,661,934 | 4/1987 | Carruth, Jr. | 364/421 X |
| 4,663,719 | 5/1987 | Matsumoto et al. | 340/988 X |

FOREIGN PATENT DOCUMENTS 0070117  4/1983  Japan .................................. 364/449

Primary Examiner—Thomas H. Tarcza
Assistant Examiner—Tod Swann
Attorney, Agent, or Firm—Dowell & Dowell

[57] ABSTRACT

A vehicle for seismic surveying fitted with a shock source device, and an electronic control and display device. The control and display device has a display panel which provides a display of required shock positions, and a movable display which moves along the display of impact positions in dependance upon vehicle travel to facilitate positioning of the vehicle at the required shock positions.

10 Claims, 4 Drawing Figures

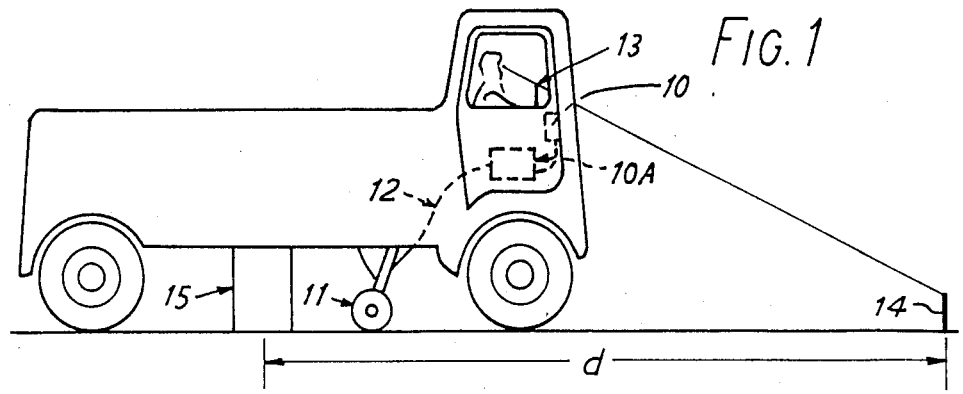
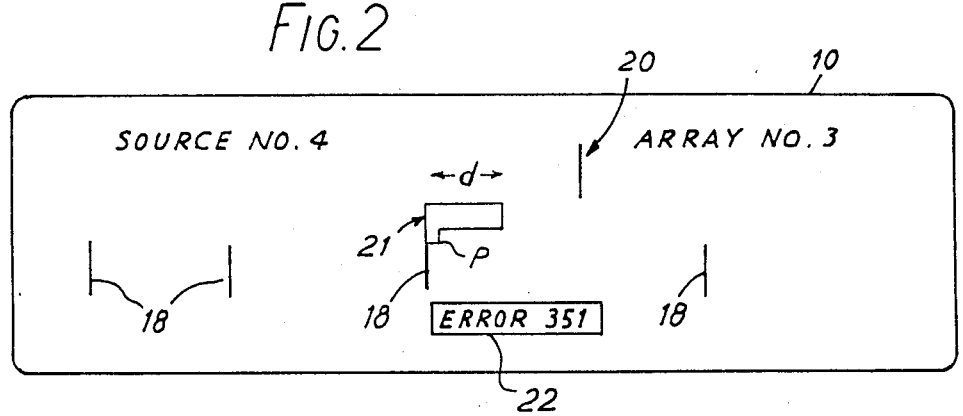
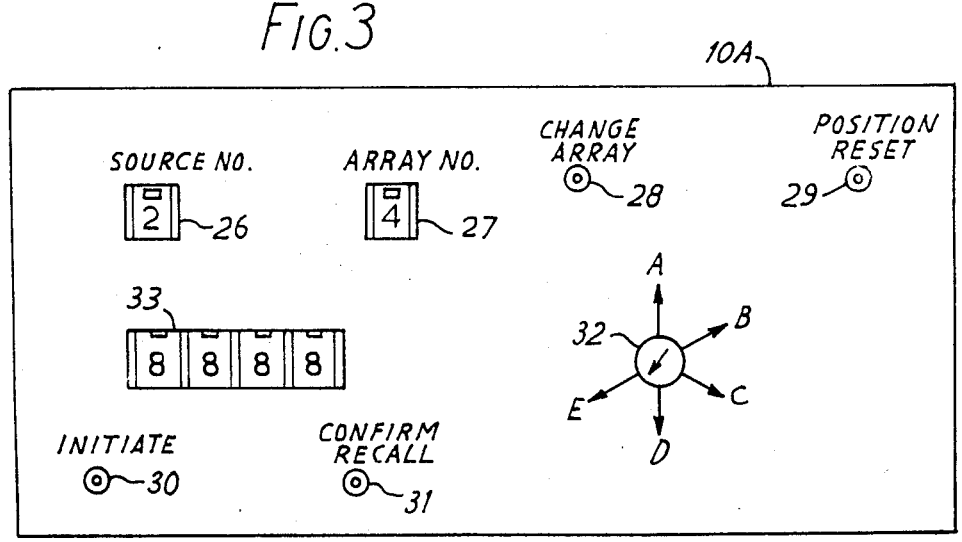

4,700,331

APPARATUS FOR SEISMIC SURVEYING

BACKGROUND OF THE INVENTION

This invention relates to seismic surveying as used in oil and gas exploration. This commonly involves the use of vehicles carrying earth shock devices (e.g. impact or vibration devices) which are required to move forwards step by step and to make impacts or vibrations on the ground at predetermined intervals of length. It is well known to mark out a length of territory by wooden pegs or similar markers at say 30 meter intervals and within each pair of adjacent pegs it is required to effect several impacts or vibrations which may be at equal or unequal distances apart according to a predetermined pattern. The drivers of such vehicles however have considerable difficulty in stopping the vehicles accurately at the required positions. Because of this difficultly one constant move up distance is employed between each impact or vibration for all the vehicles. This limits the variety of predetermined patterns which can be employed.

SUMMARY OF THE INVENTION

This invention seeks to enable a vehicle to move any selected distances between impacts or vibrations both easily and accurately.

According to the invention there is provided a seismic surveying vehicle having a shock source device for inducing local earth tremors, and being movable in relation to visual markers provided on ground over which the vehicle moves during a surveying operation, an electronic control and display device having a display panel and means coupled with the display panel for inducing on the display panel shock marker images spaced by scale distance to represent predetermined relative positions at which shock is to be applied and for providing a vehicle position image movable in dependence upon vehicle travel and representative of vehicle location relative to the position at which shock is to be applied, sighting means mounted on the vehicle by which a user can locate a ground marker, means for enabling the user to input the location of the sighted ground marker into the electronic control, and a disply device for checking the positional accuracy of the vehicle image.

The invention may include a ground contacting distance sensing device for providing a signal representative of distance travelled for the control and display device.

Preferably, means is provided for inducing on the display panel a marker image representative of a predetermined position of a visual ground marker. The marker images may be movable to define the predetermined positions.

Means may be provided for varying the position and/or rate of movement of the vehicle position image when an error is determined.

BRIEF DESCRIPTION OF THE DRAWINGS

In order that the invention and its various other preferred features may be understood more easily, an embodiment thereof will now be described, by way of example only, with reference to the accompanying diagrammatic drawings in which:

FIG. 1 shows a vehicle illustrated as a lorry, fitted in accordance with the present invention, FIG. 2 shows a display panel of an electronic control and display device fitted to the vehicle of FIG. 1, FIG. 3 shows a control panel of the electronic control and display device.

DESCRIPTION OF THE PREFERRED EMBODIMENTS

Figure 4:
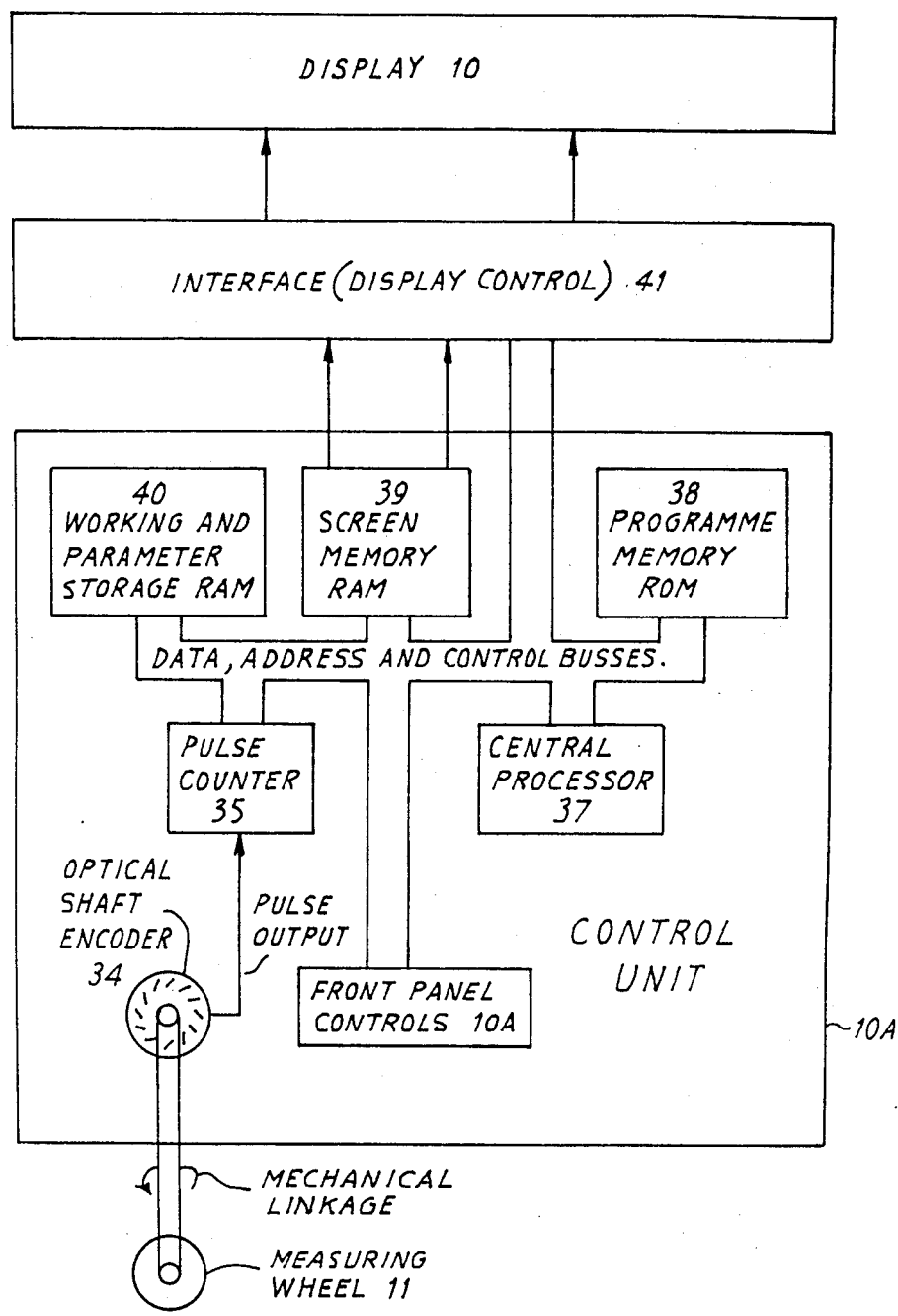
FIG. 4 is a block schematic diagram of the electronic circuitry of the control and display device.

In FIG. 1 a vehicle is shown provided with electronic control and display device having a display panel 10 and control unit 10A, a ground engaging distance measuring wheel 11, a flexible cable 12 which transmits distance travelled information to the control unit 10A, a sighting device 13, and a shock, e.g. impact, source device 15.

The display panel 10 shown in FIG. 2 is mounted in a position visible to the driver and may comprise any suitable type for example an electro-luminescent or liquid crystal array having for example a horizontal resolution of 480 pixels, or a cathode ray tube, for displaying images representing adjustable shock source positions 18, a variable ground marker position 20, and the vehicle 21. An error indicating window 22 is also provided for indicating deviation of the sensed vehicle position from an actual observed position as will be described.

FIG. 3 shows the control panel of the control unit 10A, which panel has a source indicator window 26 which represents a selected vehicle in a number of vehicles used in series, and effects selection of the position of images 18 and 20 relative to the image 21 of that vehicle through an appropriate control unit to be described. The control unit 10A includes a vehicle array indicator window 27 array push button 28 which also effects change of position of the images 18, position reset push button 29 which resets the position of the vehicle image 21, initiate push button 30, position recalibrate push button 31, mode switch 32, and a four digit thumbwheel adjusting switch 33. The switch 32 has five operational positions A to E which are selectable to define different modes of operation, as will be described.

Detectors (not shwon) are provided to detect seismic reflections which will be analysed in a known manner.

The measuring wheel 11 may be arranged to produce suitable electrical pulses, e.g. one pulse per centimetre by a suitable transducer, and a counter of these impulses is also provided. The wheel may have a hard rubber surface and may be arranged to be pressed resiliently against the ground and may be clamped off the ground when not in use. The system may be arranged to count both forwards and backwards.

FIG. 4 shows the basic elements within the control unit 10A. A microcomputer system is provided having a central processor 37, address data busses and control signals.

Forming part of the system is a transducer in this case formed by an optical shaft encoder 34 which translates, via a mechanical linkage, movement of the measuring wheel 11 into an electrical pulse output. The pulses are fed into an electronic counter 35, the output of which can be held and read and reset by the central processor.

Operating programs for the microcomputer are stored in Read Only Memory (ROM) 38. Also forming part of the main addressable memory is a working Random Access Memory (RAM) 40 which also stores parameters entered from the control unit 10A via a data bus.

The display 10 is a bit memory mapped display with the picture on the display determined by the contents of the screen memory 39, which again is part of the main addressable memeory of the microcomputer.

The interface under the control of the microcomputer operating system continuously reads the contents of the screen memory and translates the memory readings to the required drive signals to activate the appropriate pixels of the display.

An interrupt line connected to the front panel Initiate Push button 30 will instruct the central processor to read parameters set on the front panel to decide which program residing in ROM 38 is to be executed. The program selection will be determined by the front panel Mode switch 32.

The programs for all the modes other than Operate simply store front panel parameters in designated working memory locations 40.

In operation a predetermined calibrating distance to be moved between two sighting pegs is entered on the four digit thumbwheel switch 33. At the start of the traverse from one peg to the other the mode switch 32 is set to mode A "calibration" and the initiate push button 30 is pressed resetting the counter 35. Then the calibrating distance between the pegs is traversed, said 500 meters using the survey pegs for sighting, and the vehicle is stopping precisely at the end. The position recalibration push button 31 is then pressed and the contents of the counter 35 is read and processed by the central processor which calculates a pulse per unit distance value which is stored for future use. In mode B of switch 32 the "store source position" the distance between each shock source position is stored in the control unit 10A for subsequent display of the images of shock source positions 18. They are entered in the order in which the shock inducements will be performed, the last being the moveup if any to the beginning of the next pattern sequence or cycle.

The distances from one shock inducement position to the next are entered by means of the four digit thumbwheel switch 33 and the initiate push button 30, only in this mode the value indicated by the thumbwheel switch is divided by 100. Thus if the distances in the calibrate mode of switch 32 were in metres, then in this mode they would be entered as centimetres. Also the source number and array number thumbwheel switches 26, 27 would be set appropriately. As a check on correct entry, pressing the push button 31 will display the distances in sequential order on the display unit 10, together with the source and array numbers.

The required position of markers 18, 20 are set into the control unit 10A by operation of items 32, 33, 31.

If spatial precision is to be maintained it is necessary to store the dimensions d of the source unit vehicle. As explained previously, some sort of sighting arrangement is desirable to indicate to the operator when the source unit 15 is passing a station marker 14. This may be a mirror arrangement or a device similar to a gun sight. Whatever sighting arrangement is employed, the distance between the centre of the source (e.g. vibrator baseplate) and the peg 14 at the point where the marker is sighted correctly, must be physically measured. This is the distance that is entered when the switch 32 is in mode C "store station unit dimensions markers". It is unlikely that this will correspond to any dimension of the source unit vehicle as such, but this representation will be shown by the movable display 21. As will be explained later, this will enable accurate positioning to be maintained. Also, for maximum accuracy the dimension of the actual source itself is represented by one pixel width P on the movable display 21. Consequently the image of the source unit will bear little resemblance to its physical reality.

With the switch 32 set to mode D "store station markers" the four digit thumbwheel switch 33 and initiate push button 30 enter the distance between station marker pegs into the device 10A.

Once the parameters have been entered, then the main working or operate mode position E of switch 32 can be selected. On selection of this mode and pressing the initiate push button 30, a display appropriate to the selected source number and array number will be shown on the display 10. The image 21 will be positioned on the first source point 18 at the extreme left hand side of display. The program reads the front panel control unit 10A to determine which of the previously stored parametes are to be used in the Operate program. After these parameters have been read the Operate program involves the central processor reading the contents of the pulse counter, and using the predetermined parameters in the RAM 40 to calculate the distance moved and then performing the appropriate changes to the contents of the Screen Memory RAM 39, to give the required screen display. The microcomputer operating system will read the contents of the screen memory alongside the running of the main programs to continuously update the display. Movements of the vehicle will now cause the image 21 to move in the correct scaling across the display, either forwards or backwards depending upon vehicle direction. The microcomputer continually reads the contents of the pulse counter and calculates the distance moved and then positions as appropriate the image 21 on the display. When it reaches the end of the display it scrolls to always maintain a correct distance relationship with the shock source image position 18 and ground marker image position 20.

To set up at the correct position on a line of station markers both initially and subsequently when necessary, the source unit is positioned at an appropriate station marker via the sighting arrangement. Then the position reset push button 29 is pressed and the image 21 is repositioned to the nearest ground marker image position 20 on the display. Where there is more than one marker on the display, care has to be taken to ensure that the source unit image resets on the correct station. There may be more than one ground marker image position 20 e.g. two. During the recording operation where only occasional slight repositioning would be required this is no problem, but when initially setting up on the line it has to be ensured that the source unit is positioned to within the appropriate station marker before operating the initiate push button 30.

Once the image 21 has been correctly positioned on the line, the vehicle can then move to its first shock source image position 18 to begin operation. It then moves to each position 18 in succession, the operator following the image 21 on the display 10. At the end of one recording the image 21 will scroll on the display to be in the correct position to start the next sequence.

Just before the image passes a ground marker image position 20 an audible warning may be given which changes to a short burst of a different tone when they are coincident. This attracts the attention of the operator and enables him to verify his position via the marker sighting arrangement. If there is an error then pressing the push button 29 when the marker is correctly aligned in the sighting arrangement will correct the image 21 on the display 10.

The magnitude of the error correction will be shown on the display at 22. The operator has the option of then making a recalibration based on this error by actuating the push button 31 or continuing with the error. However, it would only be if similar consistent errors were shown at successive station markers that recalibration would be carried out by the operator. Errors could arise due to having to make detours because of restrictions and obstacles, bends in the line, mistakes in marker positioning etc., and it would be wrong to make a recalibration in these circumstances. Because these errors in the main cannot be foreseen, they cannot be catered for by programing. Thus the decision to recalibrate must ultimately be taken by the operator with as much aid as possible from the system.

Therefore errors cumulative or otherwise can be continuously corrected for.

The Operate program will run in a continuous loop, adjusting the display 10 appropriate to the vehicle movement until an interrupt signal is received from the Position Reset push button 29 on the front panel. It will then execute a small interrupt program to place the vehicle image 21 at the correct position alongside the ground marker image position 20, measure the effective distance the image has moved and store and display this distance as an error reading 22. It will then revert back to the main Operate program.

If the Position Recalibration push button 31 is activated, the Operate program will be interrupted and a separate program will be executed which will use the stored eror reading made previously to derive new calibration parameters and store them in the appropriate locations in RAM 40. It will then revert back to the main Operate program which will utilise the new calibration parameters in its execution.

It will be appreciated that other means of determining travel of the vehicle over the ground can be employed. Instead of a wheel a roller or a ball may be employed.

I claim:

1. In a seismic surveying vehicle having a shock source device for inducing local earth tremors, and being movable in relation to visual markers provided on ground over which the vehicle moves during a surveying operation, the provision of:
    (a) an electronic control and display device having a display panel and means coupled with the display panel for inducing on the display panel shock marker images spaced by scale distance to represent predetermined relative positions at which shock is to be applied and for providing a vehicle position image movable in dependence upon vehicle travel and representative of vehicle location relative to the positions at which shock is to be applied,
    (b) sighting means mounted on the vehicle by which a user can locate a ground marker,
    (c) means for enabling the user to input the location of the sighted ground marker into the electronic control, and
    (d) a display device for checking the positional accuracy of the vehicle image.

2. In a vehicle as claimed in claim 1, the provision in the control and display device of means for inducing on the display panel a marker image representative of a predetermined position of a visual ground marker.

3. In a vehicle as claimed in claim 2, the provision in the control and display device of adjustment means for moving the marker images to define the predetermined positions.

4. In a vehicle as claimed in claim 3, the provision of a ground contacting distance sensing device mounted on the vehicle and coupled with the control and display device for providing a signal representative of distance travelled for the control and display device.

5. In a vehicle as claimed in claim 4, the provision of a wheel mounted on the vehicle and forming the ground contacting distance sending device.

6. In a vehicle as claimed in claim 1, the provision of an optical shaft encoder coupled with and drivable by the distance sensing device for providing pulses representative of vehicle movement and a pulse counter coupled with the encoder sensing the pulses.

7. In a vehicle as claimed in claim 1, the provision that the movable display is arranged to have a length representative of the distance from the shock source device to a required ground marker when located by the sighting means.

8. In a vehicle as claimed in claim 7, the provision of a control panel on the control and display device having an array change switch member for changing the positions of the marker images, a reset switch member for resetting the position of the movable image, a mode switch for selecting positions for calibration of movement of the vehicle position image, storing of adjusted shock marker images, storing the position of station marker image(s), storing a value representative of the distance from the shock source device to a required ground marker when located by the sighting means.

9. In a vehicle as claimed in claim 8, the provision that the electronic control and display device comprises computer control circuits having a central processor coupled with the switches and the control panel, a working and parameter storage RAM, a screen memory RAM and program memory ROM, all coupled between the pulse counter and the central processor on the one hand and an interface on the other, which interface is coupled with the display means.

10. An apparatus as claimed in claim 1, including means provided in the electronic control to measure positional errors of the predetermined relative positions and to effect corrections and, according to choice, to effect recalibration of signals representing the distance travelled whereby further positional errors occurring during continued travel can be reduced.

* * * * *